(12) United States Patent
Okmyanskiy et al.

(10) Patent No.: US 9,674,793 B2
(45) Date of Patent: Jun. 6, 2017

(54) WALK-ASSISTED AUTOMATED AP COVERAGE ADJUSTMENT

(71) Applicant: Cisco Technology, Inc., San Jose, CA (US)

(72) Inventors: Anton Okmyanskiy, Vancouver (CA); Leigh Chinitz, Wellesley, MA (US); Mark Grayson, Maidenhead (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 94 days.

(21) Appl. No.: 14/564,880

(22) Filed: Dec. 9, 2014

(65) Prior Publication Data

US 2016/0165550 A1    Jun. 9, 2016

(51) Int. Cl.
| | | |
|---|---|---|
| *H04W 52/24* | (2009.01) | |
| *H04W 24/08* | (2009.01) | |
| *H04W 52/36* | (2009.01) | |
| H04W 84/04 | (2009.01) | |
| H04W 24/02 | (2009.01) | |
| H04W 24/10 | (2009.01) | |

(52) U.S. Cl.
CPC ......... *H04W 52/245* (2013.01); *H04W 24/08* (2013.01); *H04W 52/244* (2013.01); *H04W 52/367* (2013.01); *H04W 24/02* (2013.01); *H04W 24/10* (2013.01); *H04W 84/045* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,457,262 B1 | 11/2008 | Doshi et al. | |
| 7,966,021 B2 | 6/2011 | Dietrich et al. | |
| 8,451,120 B2 | 5/2013 | Johnson, Jr. et al. | |
| 8,805,380 B2 | 8/2014 | Grayson | |
| 8,811,189 B2 * | 8/2014 | Pandey | H04W 24/00 370/241 |
| 2012/0142392 A1 * | 6/2012 | Patel | H04W 52/143 455/522 |
| 2013/0003588 A1 * | 1/2013 | Gage | H04W 16/10 370/252 |
| 2013/0031036 A1 * | 1/2013 | Kojima | G06N 99/005 706/12 |
| 2014/0241316 A1 | 8/2014 | Okmyanskiy et al. | |
| 2015/0103685 A1 * | 4/2015 | Butchko | H04L 43/50 370/252 |
| 2015/0312837 A1 * | 10/2015 | Baldwin | H04W 4/046 370/237 |

(Continued)

*Primary Examiner* — Christopher Crutchfield
*Assistant Examiner* — Thinh Tran
(74) *Attorney, Agent, or Firm* — Patent Capital Group

(57) ABSTRACT

Systems and methods for controlling the power of small cells in a coverage area includes obtaining signal strength measurements of wireless signals received from a plurality of small cells in a defined coverage area by identifying signal strength at a plurality of locations near the perimeter of the coverage area, and determining a revised transmit power of the small cells based on the determined signal strength (a) to maintain a minimum threshold of received signal while reducing the average power within the coverage area, or (b) to reduce leakage outside the perimeter of the coverage area relative to a desired threshold.

18 Claims, 10 Drawing Sheets

(56) References Cited

U.S. PATENT DOCUMENTS

| | | | |
|---|---|---|---|
| 2016/0043815 A1* | 2/2016 | Panaitopol | H04W 16/14 370/252 |
| 2016/0127069 A1* | 5/2016 | Nuss | H04W 16/10 370/329 |
| 2016/0165469 A1* | 6/2016 | Gopalakrishnan | H04W 24/02 455/67.11 |
| 2016/0165472 A1* | 6/2016 | Gopalakrishnan | H04W 24/10 455/67.11 |

* cited by examiner

WALK-ASSISTED AUTOMATED AP COVERAGE ADJUSTMENT

BACKGROUND

In wide area wireless communication networks, relatively high power base stations are provided in cellular network to serve wireless client devices or user devices. Each base station serves wireless user devices in a cell that is primarily determined by the power of the signal it can transmit. Wireless service to user devices located within large buildings can become degraded when the user device has difficulty receiving a signal from the base station, even if the building is well within the coverage area of the base station.

To augment the coverage of the wireless network, wireless transceiver devices with relatively small coverage areas (and serving capacities) can be deployed. Depending on their coverage area and serving capacities, these wireless transceiver devices are referred to as femtocells, microcells, or picocells, or more generally, "small cell" access point devices. Generally, a small cell access point includes a wireless transceiver device that is configured to serve wireless user devices over relatively small coverage areas and with generally less capacity as compared to a macro base station that is configured to serve a relatively large coverage area ("macro cell") and consequently many more client devices. These small cell access points may be deployed inside or near buildings to serve client devices where signals from a macro base station are too weak.

DESCRIPTION OF EXAMPLE EMBODIMENTS

The systems and methods described here are for obtaining signal strength measurements of wireless signals received from a plurality of small cells in a defined coverage area, the small cells having an initial transmit power. The obtaining includes identifying signal strength at a plurality of locations near the perimeter of the coverage area. This obtaining can be performed by moving sensors in a manual or automated manner, or by using fixed sensors. The systems and methods can determine revised transmit power levels for the small cells to use based on the determined signal strength either to maintain a minimum threshold of received signal while reducing the average power within the coverage area, or to reduce leakage outside the perimeter of the coverage area relative to a desired threshold.

Figure 1:
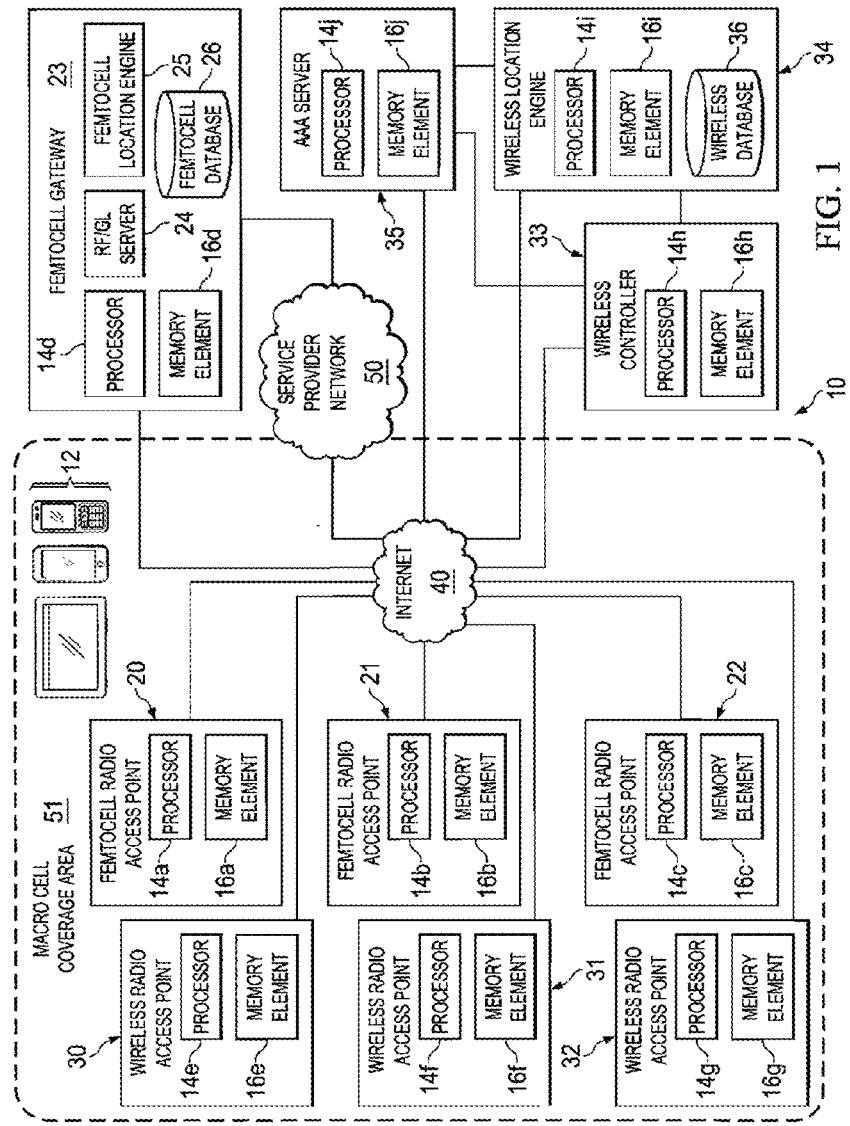
FIG. 1 is a schematic block diagram showing macro cells and small cells.

FIG. 1 is a simplified block diagram from U.S. Publication 2014/0241316, published Aug. 28, 2014, showing an example of a communication system 10 for context. System 10 includes a user equipment (UE) 12, femtocell radio access points (FAPs) 20, 21, 22, a femtocell gateway (FGW) 23, wireless radio access points (WAPs) 30, 31, 32, a wireless controller (WC) 33, a wireless location engine (WLE) 34, an Authentication, Authorization and Accounting (AAA) server 35, an internet 40 and a service provider network 50. FAPs 20, 21, and 22, FGW 23, WAPs 30, 31, and 32, WC 33, WLE 34, and AAA server 35 may each include a respective processor 14a-14j and a respective memory element 16a-16j. FGW 23 may further include an RF/geo-location (RF/GL) server 24, a femtocell location engine (FLE) 25, and a femtocell database 26. WLE 34 may further include a wireless database 36. As used herein, small cells may generally be referred to as femtocells interchangeably.

FAPs 20, 21 and 22, which are a type of small cell access point, may be connected to FGW 23 via internet 40. FGW 23 may further be connected to service provider network 50 in this example implementation, and use bandwidth that is licensed for cellular use. FAPs 20, 21, and 22 and FGW 23 may make up a femtocell radio network or femtocell system. WAPs 30, 31, and 32 may be connected to WC 33, WLE 34, and AAA server 35 via internet 40. WAPs 30, 31, and 32, WC 33, WLE 34, and AAA server 35 may make up a wireless local area network, also referred to herein as a wireless or Wi-Fi system, which can use unlicensed bandwidth.

FIG. 1 also shows a macro cell coverage area 51. A macro cell radio access network (RAN) made up of base stations communicates with a service provider network 50, which may provide cellular/mobile voice and data coverage for macro cell coverage area 51. In various instances, the macro cell RAN can include access networks such as GSM EDGE radio access network (GERAN), UMTS terrestrial radio access network (UTRAN), generally referred to as 3G, and/or long term evolution (LTE) access networks such as evolved UTRAN (E-UTRAN), generally referred to as 4G or LTE. UE 12 may be dual-mode equipment configured with wireless (e.g., Wi-Fi) communication capabilities as well as cellular/mobile communication capabilities.

Femto cells can be deployed as autonomous units to improve reception in areas with poor coverage, e.g., within buildings where coverage is adversely affected by the structure itself. UE that are in communication with small cell APs can have their data transmissions routed to the service provider's network (e.g., over the internet, over any suitable network, etc.). In Open Mode deployments, coverage provided by a small cell AP is generally open to anyone within range, unless configurations operate to limit access to the network to only those individuals duly authorized for access.

FAPs are essentially fully featured base stations that can provide proximate coverage in a business (e.g., enterprise) environment. Femtocells operate at low radio power levels as compared to macro cell RANs. FAPs can be connected using a standard broadband digital subscriber line (DSL), internet, or cable service into the service provider's network. Calls can be made and received, where the signals are sent (potentially encrypted) from the FAP via the broadband IP network to one of the operator's main switching centers. FAPs can be provisioned to readily handle 8, 16, 32, etc. concurrent calls.

The systems and methods described here relate to reducing interference between FAPs, and between FAPs and macro cell base stations. These systems and methods can be used with any type of technology, but are particularly useful for CDMA types of systems, such as UMTS (wideband CDMA) and the 3GPP2 CDMA specifications, because each device shares the same frequency spectrum but are divided into channels defined by codes (as opposed to being frequency divided from channel to channel). However, the approaches described here could be used with TDMA, OFDMA, OFDM, or any other wireless system. Thus, to the extent the claims recite specific technologies, or use of licensed or unlicensed bands, such features are optional.

The systems and methods described here can be used with a system for installing, controlling, managing, and/or monitoring small cells in a coverage area. The coverage area is described here as a building for explanatory purposes, but it could be some other area, such as a campus, and could include outdoor areas. The process includes making measurements of signal strength, e.g., received signal code power (RSCP) or receive signal strength indicator (RSSI), and adjusting the power of the small cells in response to the signal strength measurements to achieve desired results as explained here.

Referring to FIGS. 2-9, examples of this process are demonstrated through discussion in the context of an analysis for a single floor of an office building. In this particular example, the coverage area is the area of the floor, here 5271 m$^2$ (56,740 ft$^2$), and there are four (4) small cells placed within the coverage area and oriented in a diamond shape as shown. The system has a threshold for there to be considered coverage; in this example, the RSCP value should be greater than −105 dBm for there to be considered coverage.

Figure 2:
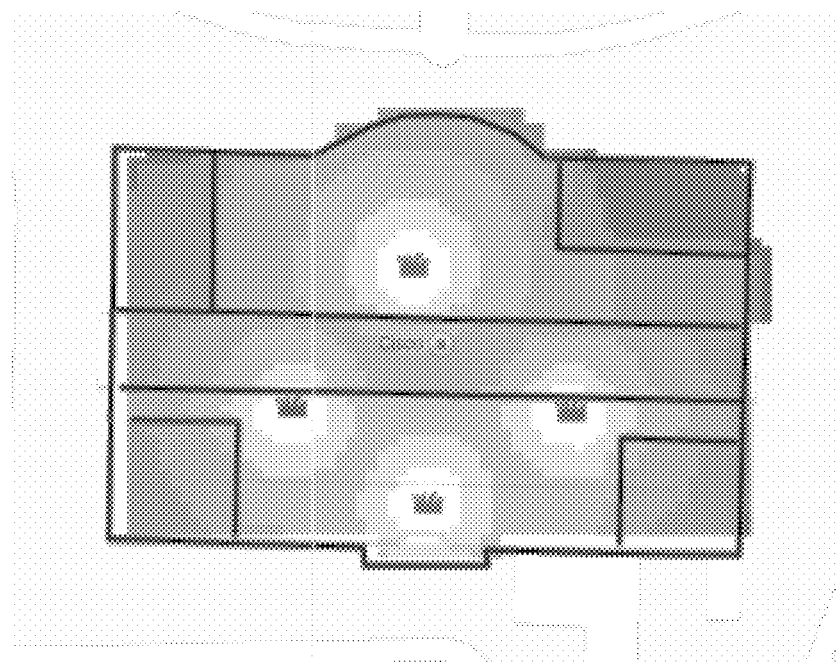
FIGS. 2-9 are heat maps illustrating signal strength in and around a coverage area.

Referring to FIG. 2, with the small cells at their maximum transmit power, an RSCP heat map for this environment is as shown. In this figure, the darker the gray color, the lower the RSCP; and each color shade represents a range of about 7 dB. In this case, coverage is acceptable everywhere within the desired coverage area; but in fact, the coverage can be considered "too good." That is, the lowest value of RSCP is several dB stronger than the required minimum. And in other locations, very high RSCP levels are seen even at the building wall, which is at the edge of the desired coverage area; e.g., most of the left-side wall ranges from about −60 to −70 dBm. The systems and methods can use full power of all small cells as a starting point, although any known power level can be used as the starting point from which adjustments are made.

Figure 3:
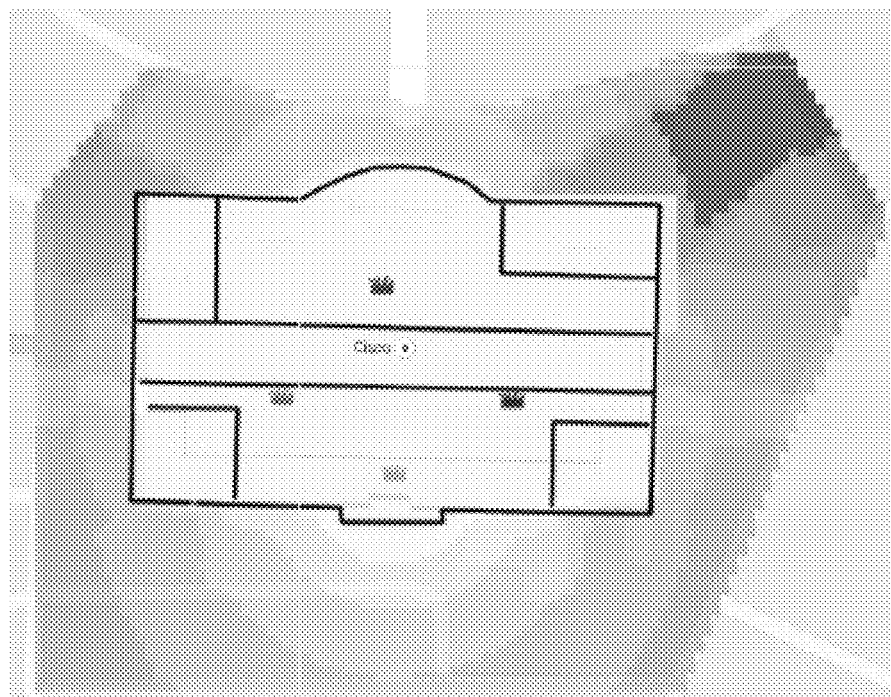

Referring to FIG. 3, outside the desired coverage area (that is, outside the walls of the building), signal leakage from the small cells could cause interference to any UEs that would be connected to macro cells. Except for the upper right corner in FIG. 3, most of the area has much higher power than required for coverage, again in the range from −75 to −95 dBm.

Figure 4:
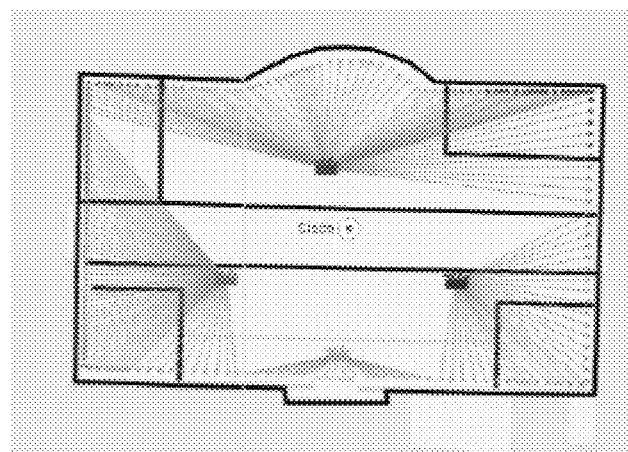

Referring to FIG. 4, the systems and methods described here can use a "walk test" to generate data that can be used to tune the small cell transmit powers to provide coverage, as defined, without providing too much excess power. As implied by the term "walk test," an individual could literally walk (or move in some other manner) from one point to another to obtain signal strength measurements. Typically, such measurements would be made along the perimeter (as indicated in FIG. 4) where signal strength will tend to be weaker, and where one can determine leakage. However, readings could be made in other ways, such as in an automated manner, or could be made with fixed sensors, and measurements could be made from a variety of different locations. The RSCP values are shown around the interior perimeter, but could be taken at the exterior perimeter. In either case, the entire perimeter would need not be measured, but there could be a desired area.

Figure 5:
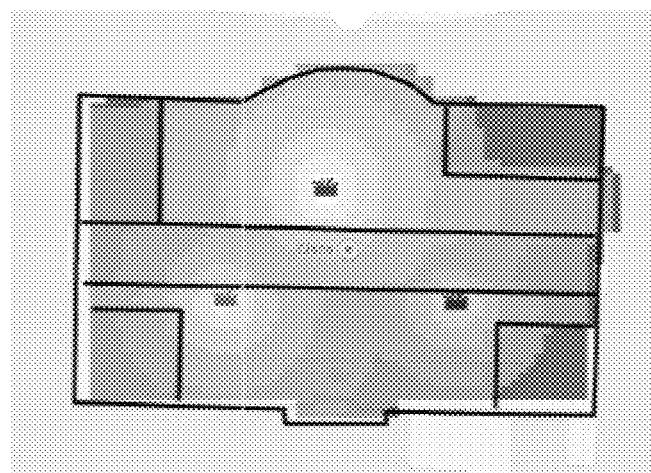

Referring to FIG. 5, using the test data as inputs, along with the example requirement that the RSCP is ≥−105 dBm, a processing system uses a model and information about the floor to determine that the power of the small cells could be reduced by different amounts depending on their locations. Some could reduce their power by only a few dB, while others reduce their powers by several tens of dB.

The results after the power adjustments have been made show that the coverage area is still served with RSCP in excess of −105 dBm; however, there is significant reduction, especially in the lower right of FIG. 5 compared to what was shown in the lower right of FIG. 2. Compared to the full power results, the defined adequate coverage has been maintained within the target area but with less excess power.

Figure 6:
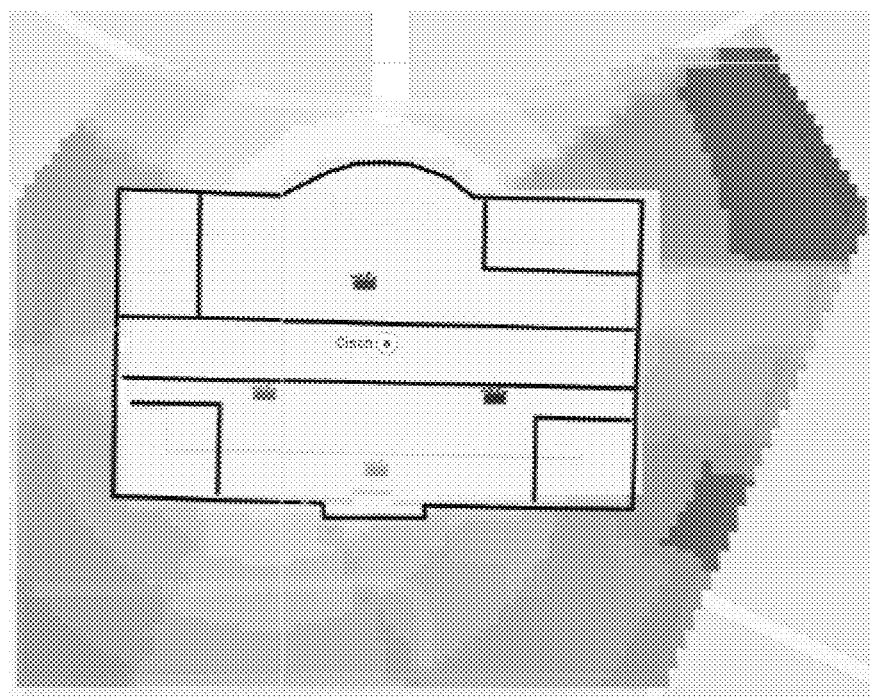

Referring to FIG. 6, outside that coverage area, outside the exterior perimeter, the mean leakage signal has been reduced by about 12.8 dB, the median leakage signal has been reduced by 14.7 dB, and the 95% leakage level has been reduced by about 10 dB.

Figure 7:
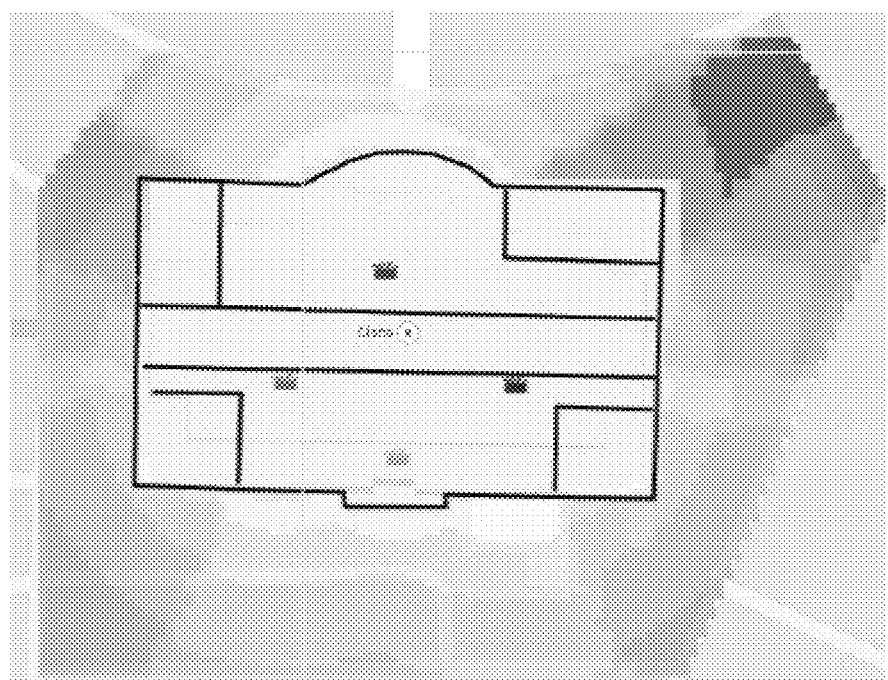

Referring to FIG. 7, as an additional embodiment, external measurements (or extrapolations to external measurements) can be used to meet specific signal leakage target as a primary objective (as opposed to meeting minimum coverage without excess power being the primary objective with a benefit of reducing leakage). External measurements could include literally making measurements just outside the desired coverage area, e.g., by walking or otherwise moving manually around the exterior perimeter of a building, placing sensors around the perimeter, or using an automated device to move about the area. Alternatively, the measurements could be estimated by making internal measurements and using structural information (e.g., presence of windows and materials used to make the walls) to make estimations at the exterior.

In this example, it is assumed that a requirement is declared that the externally transmitted signal should not cause a rise in the noise floor of a UE outside the coverage area by more than 3 dB. This means that the transmitted UE signals should be at or below the level of the noise floor outside the targeted coverage area. In one example, for a 5 MHz receiver with a 10 dB noise figure, the noise floor would be −97 dBm.

Figure 8:
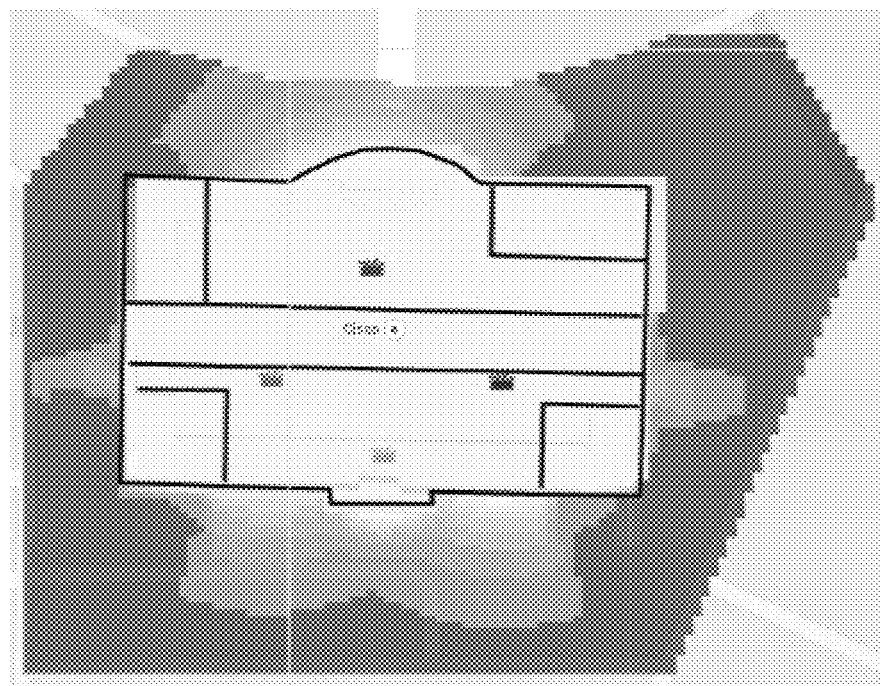

Referring to FIG. 8, using this criteria to set the small cell transmit powers, the transmit powers of the small cells drop to very low levels in all cases. The signal strength seen outside has 95% signal strength level that is well below the UE noise floor. The resulting rise in the noise floor of a UE located just outside the desired coverage area is as shown. The noise rise does not exceed the 3 dB target. In fact, 90% of the time the impact on the noise floor is below 0.79 dB.

Figure 9:
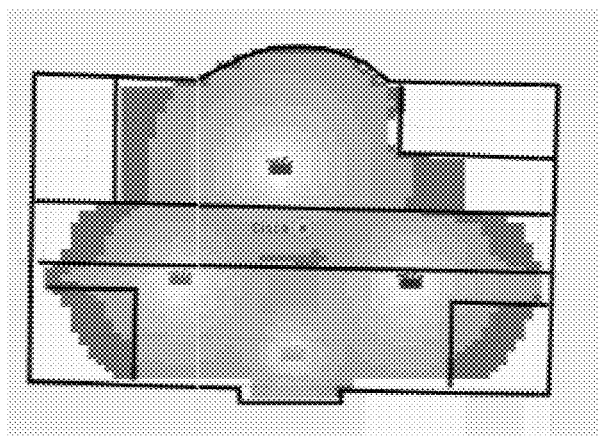

Referring to FIG. 9, it might not always be possible to meet both an internal coverage and an external leakage requirement. In this case, for example, the internal resulting RSCP coverage is as shown. Only 76% of the desired coverage area is now addressed. Thus, compromises may be needed, such as allowing some areas to have poor coverage if leakage is a high priority.

Figure 10:
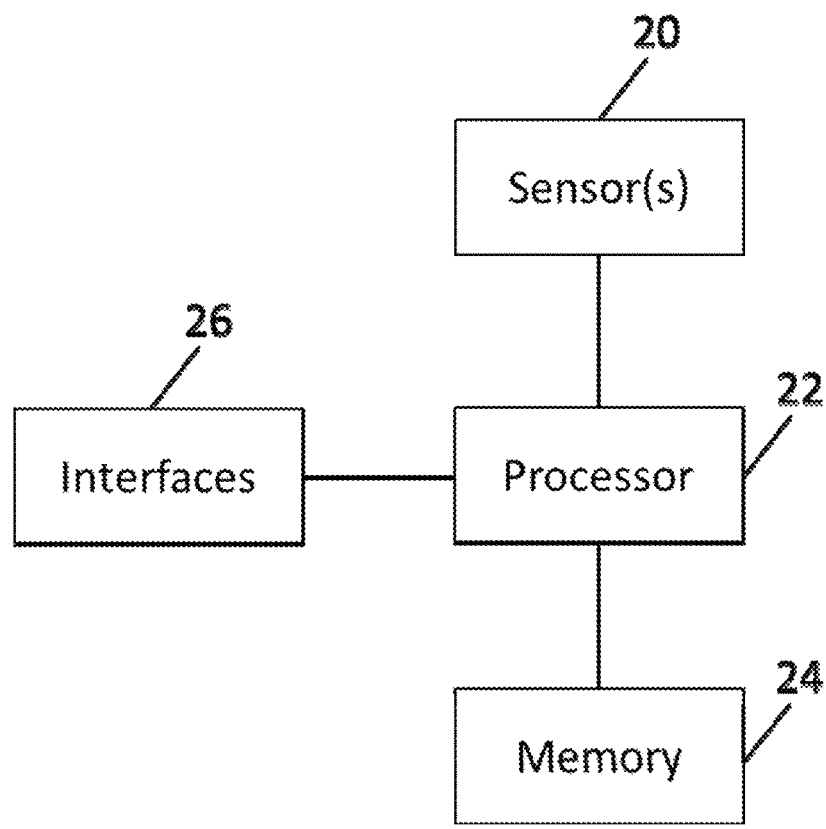
FIG. 10 is a block diagram of a system according to certain embodiments of the inventions.

Referring to FIG. 10, the methods described here can be implemented with one or more sensors 20 for sensing the signal strength (e.g., RSSI or RSCP), coupled to a processor 22 (though wired or wireless connection), which is coupled to memory for storing information and executable instructions. Interfaces 26 allows user input and results to the user (e.g., keypad, touch screen, track pad, printer, etc.). The system can include information about the coverage area (e.g., floor size and shape), the number and location of the small cells, and materials used to construct the floor. From this information and with signal strength measurements from the sensors, the processor performs an analysis to determine how to adjust the power output of the small cells by estimating the contributions from different cells based on the power of the small cells and the distance from the cells to the locations. The information also includes one or more models for estimating signal strength based on the power of the small cells, configuration of the coverage area, and distance from various locations to small cells. It is generally known how power varies over distance from a source, and how signal strength can vary in different materials.

Other embodiments are within the following claims. For example, many different types of hardware can be used, including one or more microprocessors, application-specific integrated circuitry, clusters of CPUs, etc., all of which can be generally referred to as a processor. The memory can be a single unit or multiple units in combination (which may or may not be connected to each other).

What is claimed is:

1. A method comprising:
obtaining signal strength measurements of wireless signals received from a plurality of small cells located within a defined coverage area having a perimeter, wherein the signal strength measurements are performed at a plurality of locations near the perimeter of the defined coverage area; and
determining revised transmit power levels for at least two small cells of the plurality of small cells, wherein the revised transmit power levels are determined based on the signal strength measurements performed at the plurality of locations near the perimeter of the defined coverage area and are also based on a minimum signal strength requirement applicable to the entire defined coverage area, the minimum signal strength requirement specifying the minimum signal strength provided by each of the at least two small cells within the defined coverage area, wherein the revised transmit power levels are determined to allow provision of the minimum signal strength requirement within the defined coverage area and to reduce the average signal strength within the defined coverage area.

2. The method of claim 1, further comprising changing the transmit powers of the at least two small cells based on the determined revised transmit power levels.

3. The method of claim 1, wherein the obtaining of signal strength measurements includes manually moving a sensor to the plurality of locations.

4. The method of claim 1, wherein the obtaining of signal strength measurements includes moving a sensor from at least one of the plurality of locations to another of the plurality of locations in an automated manner.

5. The method of claim 1, wherein the obtaining of signal strength measurements includes obtaining signal strength measurements from one or more fixed sensors.

6. The method of claim 1, wherein the determining is performed to maintain a minimum threshold of received signal while reducing the average power within the coverage area.

7. The method of claim 1, wherein the determining is performed to reduce leakage outside the perimeter of the coverage area relative to a desired threshold.

8. The method of claim 1, wherein the determining is performed based on calculations that include the use the signal strength measurements, a value of a threshold, and information regarding the location of small cells.

9. The method of claim 1, wherein the small cells transmit using a licensed bandwidth that is the same as the bandwidth licensed for a cellular carrier.

10. The method of claim 1, wherein the small cells transmit using an unlicensed bandwidth.

11. A system comprising:
memory for storing executable instructions and for storing parameters relating to the locations of a plurality of small cells that provide wireless coverage for a defined coverage area;
a processor coupled to the memory, the processor to:
receive signal strength measurements performed at a plurality of locations near the perimeter of the defined coverage area, wherein the plurality of small cells are located within the perimeter of the defined coverage area; and
determine revised transmit power levels for at least two small cells of the plurality of small cells, wherein the revised transmit power levels are determined based on the received signal strength measurements performed at the plurality of locations near the perimeter of the defined coverage area and are also based on a minimum signal strength requirement applicable to the entire defined coverage area, the minimum signal strength requirement specifying the minimum signal strength provided by each of the at least two small cells within the defined coverage area, wherein the revised transmit power levels are determined to allow provision of the minimum signal strength requirement within the defined coverage area and to reduce the average signal strength within the defined coverage area.

12. The system of claim 11, wherein the determining is performed to maintain a minimum threshold of received signal while reducing the average power within the coverage area.

13. The system of claim 11, wherein the determining is performed to reduce leakage outside the perimeter of the coverage area relative to a desired noise floor threshold.

14. The system of claim 11, wherein the determining is performed based on calculations that include the use the signal strength measurements, a value of a threshold, and information regarding the location of small cells.

15. The system of claim 11, wherein the signal strength measurements are received from small cells using a licensed bandwidth that is the same as the bandwidth licensed for a cellular carrier.

16. The system of claim 11, wherein the signal strength measurements are received from small cells using an unlicensed bandwidth.

17. The system of claim 11, further comprising at least one sensor for detecting signal strength.

18. The system of claim 11, wherein the determining is performed based on a combination of maintaining a minimum threshold of received signal while reducing the average power within the coverage area and reducing leakage outside the perimeter of
the coverage area relative to a desired threshold.

* * * * *